Figure 1:
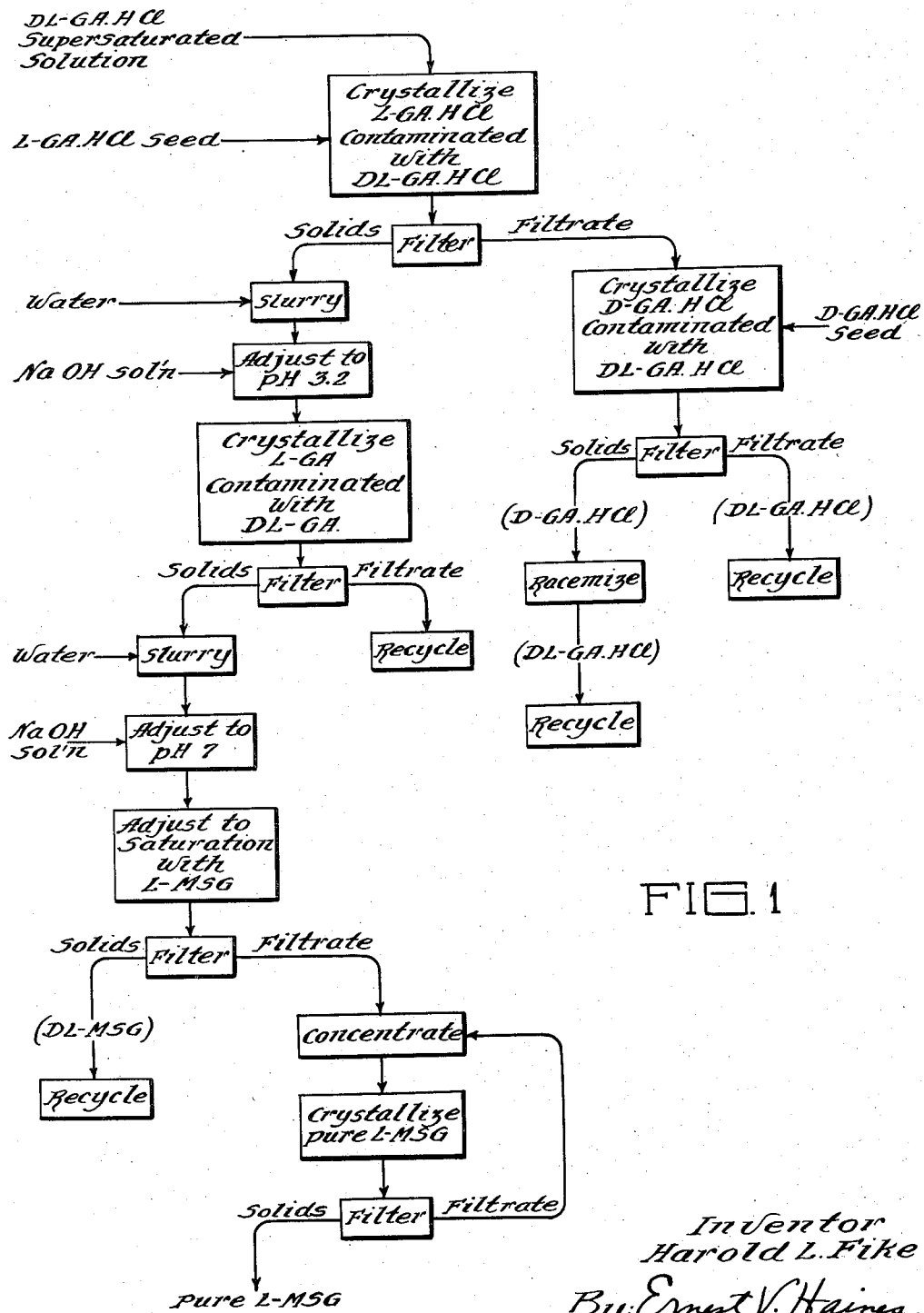

April 14, 1959      H. L. FIKE      2,882,302

PURIFICATION OF GLUTAMIC ACID ENANTIOMORPHS

Filed April 29, 1957      2 Sheets-Sheet 1

Inventor
Harold L. Fike
By: Ernest V. Haines
Attorney

United States Patent Office 2,882,302
Patented Apr. 14, 1959

2,882,302
PURIFICATION OF GLUTAMIC ACID ENANTIOMORPHS

Harold L. Fike, Chicago, Ill., assignor to International Minerals & Chemical Corporation, a corporation of New York Application April 29, 1957, Serial No. 655,805

14 Claims. (Cl. 260—534)

This invention relates to the separation of mixtures of D-glutamic acid and L-glutamic acid, and more particularly to the treatment of such mixtures to separate the individual isomers in substantially pure form.

Glutamic acid is a well-known amino acid, occurring in nature as free L-glutamic acid and as derivatives thereof. It is widely used in the form of monosodium L-glutamate as a flavor intensifier, and for other purposes connected with the food and pharmaceutical industries. Glutamic acid has heretofore been derived almost entirely from natural sources, in which it occurs substantially exclusively as the L-isomer. As an alternative source, efforts have been made to prepare the acid by synthetic means, starting with a variety of substances. These synthetic methods, however, uniformly result in the formation of racemic (i.e., optically neutral) DL-glutamic acid or salts theerof. Such a mixture might conceivably be used without separation of the undesired D-isomer, but the latter, being physiologically inactive and without flavor-intensifying properties, would represent a considerable waste. Methods have accordingly been developed for effecting an at least partial separation ("resolution") of the isomers and for converting the separated D-isomer into the desired L-isomer.

The various resolution methods in general yield two products: L-glutamic acid contaminated with at least a small proportion of D-glutamic acid, and D-glutamic acid contaminated with at least a small proportion of L-glutamic acid. Each of these products may be considered, for the purpose of the present description, to be optically active glutamic acid containing a quantity of racemic glutamic acid as an impurity. A primary object of the present invention is to separate the racemic glutamic acid from such products, leaving optically active glutamic acid in substantially pure form.

Another object is to provide a method for completing the resolution of racemic glutamic acid.

Another object is to separate monosodium L-glutamate in purified form from admixture with monosodium DL-glutamate.

Another object is to separate monosodium D-glutamate in purified form from admixture with monosodium DL-glutamate.

A further object of the invention is to provide a commercially feasible process for the complete resolution of DL-alpha-aminocarboxylic acids which does not require the use of expensive reagents or equipment.

I have discovered that monosodium DL-glutamate is substantially completely insoluble in an aqueous solution that is saturated or nearly saturated with monosodium L-glutamate or monosodium D-glutamate. On the basis of this discovery, I have succeeded in preparing substantially pure monosodium L-glutamate by a process which, in one embodiment, may comprise the following steps. As the starting material, I employ a mixture of monosodium L-glutamate and monosodium D-glutamate wherein the L-isomer is present in greater than 1:1 molar ratio. This corresponds, in ultimate effect, to a mixture of monosodium L-glutamate with racemic monosodium glutamate. The salt mixture is commingled with water, the quantity of water being limited so as to form a solution substantially saturated with monosodium L-glutamate. It is, of course, desirable to employ a sufficient quantity of water to dissolve as much as possible of the L-isomer, while yielding a solution having the desired degree of saturation. The mixture of salts and water is agitated until equilibrium is reached, during which time the monosodium D-glutamate associates with an equimolar proportion of monosodium L-glutamate, forming monosodium DL-glutamate dihydrate, which is insoluble in the saturated monosodium L-glutamate solution. The resulting slurry is filtered or otherwise treated to separate the liquid and solid phases. The solid phase is monosodium DL-glutamate, plus any monosodium L-glutamate in the original salt mixture over and above the quantity required to saturate the liquid phase. The liquid phase is a solution of monosodium L-glutamate, substantially free free from the D-isomer and from the racemic mixture. The purified monosodium L-glutamate is readily recovered therefrom in a known manner.

In another embodiment of my invention, a mixture of monosodium L-glutamate and monosodium DL-glutamate is dissolved in water and the solution is subjected to evaporation and/or cooling to bring the quantity of non-racemized monosodium L-glutamate near the saturation point. At this point the racemic salt crystallizes completely, leaving only the L-isomer in solution. The racemic crystals are separated by filtration or the like, and the desired L-glutamic acid values are recovered from the residual solution in a known manner.

In a further embodiment of the invention, an aqueous solution of D- and L-glutamic acids or of D- and L-glutamic acid hydrochlorides predominating in the L-enantiomorph is adjusted to a pH around 7 with sodium hydroxide to form the sodium salts, the resulting solution is diluted, concentrated, heated, or cooled as required to form an approximately saturated solution of monosodium L-glutamate, the DL-salt is crystallized therefrom, and the L-salt is recovered from the residual solution.

In similar ways, a glutamic mixture containing a greater than 1:1 molar ratio of the D-isomer can be made to deposit racemic crystals of monosodium glutamate from solution when the monosodium salt of the non-racemized D-isomer is near the saturation point, leaving substantially pure D-isomer in solution, from which it can be recovered.

It will be observed that my invention employs an unbalanced charging stock—i.e., a stock which predominates in either the L-isomer or the D-isomer of glutamic acid. Such a stock is not ordinarily obtained from the synthetic glutamic acid processes of the prior art, which generally produce a racemic mixture. My unbalanced mixture can conveniently be prepared from racemic glutamic acid mixtures by a variety of means, notably by selective fractional crystallization to effect at least some degree of resolution. For example, if a supersaturated solution of DL-glutamic acid is seeded with D-glutamic acid, a substantial proportion of D-glutamic acid will crystallize therefrom, leaving in the solution D-glutamic acid with an excess of L-glutamic acid over the racemic mixture composition. Alternatively, the supersaturated racemic solution can be seeded with L-glutamic acid, whereby an excess of D-glutamic acid is left in solution. As a further alternative, a supersaturated solution of DL-glutamic acid hydrochloride, hydrobromide, or hydriodide can similarly be seeded with the corresponding hydrohalide of the D- or L-isomer. In another method, a supersaturated solution of monoammonium DL-glutamate can be seeded with monoammonium D- or L-glutamate to initiate selective crystallization of the seeded enantiomorph. In each of these cases, the selective crystallization can also be carried out by passing the racemic supersaturated solution over a column of the appropriate seed, and the selective crystallization will take place within the treating column. Other methods for effecting a partial resolution of the racemic mixture may readily be ascertained from the art. For my starting material, I can employ either the solution or the crystalline product obtained by such partial resolution procedures, since both fractions contain an unbalanced mixture of D- and L-glutamic acid values.

The crystalline product obtained by selective seeding is readily purified in accordance with my invention by slurrying the crystals in water, adding a stoichiometric quantity of sodium hydroxide to reach or maintain pH 7, stripping off ammonia if present, adjusting the concentration until the solution is nearly saturated with respect to the monosodium salt of the desired isomer, and separating the impurity in the form of crystals of racemic monosodium glutamate. The major proportion of the starting material remains in solution as pure optically active monosodium glutamate.

When racemic glutamic acid is partially resolved by selective seeding with an optically active isomer according to the procedure outlined above, the resulting solution ordinarily contains a higher proportion of contaminating isomer than the crystals. Nevertheless, the solution can also be treated in accordance with my invention by converting to monosodium glutamates, adjusting the concentration to approximately the saturation point of the desired isomer, and separating crystals of the racemic salt therefrom. In this case also, the desired salt is left in the residual liquor in substantially pure form.

My invention readily produces optically active monosodium glutamate in a purity exceeding 98% by weight from starting materials of lower purity. The degree of purity will depend to some extent upon the concentration of the desired isomer in the aqueous phase at the time the solid (racemic) phase is separated. I prefer that said aqueous phase be saturated under the existing conditions at such time (e.g., 45% by weight monosodium L-glutamate monohydrate, based on total solution, at 25° C.), with the result that the product purity commonly exceeds 99% by weight. I find, however, that a product of 98% purity can be obtained with a solution that is as little as 80% saturated. Accordingly, it is to be understood that solutions of such concentration may also be employed in carrying out the process of my invention. The purity of the starting material has little effect on the purity of the product, so long as the quantity of the desired enantiomorph therein is sufficient to substantially saturate the amount of water required to slurry the starting material. An input L:D ratio of 9:1 to 2:1, for instance (Example 5, below), gives a product purity of 99.2-99.4% monosodium L-glutamate.

The following table will illustrate the relative insolubility of monosodium DL-glutamate (DL-MSG.2H$_2$O) in aqueous solutions of the L-isomer (L-MSG.H$_2$O) at 25° C.

| Solution | | Solubility, DL-MSG.2H$_2$O |
|---|---|---|
| Water | L-MSG.H$_2$O | |
| G. | G. | G. |
| 100 | 0 | 25 |
| 90 | 10 | 13 |
| 80 | 20 | 6 |
| 70 | 30 | 2.8 |
| 60 | 40 | 1.0 |
| 55 | 45 (saturated) | 0.6 |

To further repress the solubility of monosodium DL-glutamate in a solution of optically active isomer, I may add thereto a further quantity of sodium ions in the form of sodium chloride, sodium sulfate, or other water-soluble sodium salt having an innocuous anion. Such a salt may be added up to the saturation point of the solution, greater portions obviously serving no purpose except to contaminate the solid phase. A salt of such type may also be used, if desired, with an unsaturated solution of optically active isomer, whereby the solution is conveniently saturated with sodium ions and the desired separation is facilitated. In all cases, I find it desirable for the solution to be at least about 80% saturated with optically active isomer at the time of separating the racemic solid phase.

The separation of the solid phase from solution is preferably carried out at temperatures in the range of about 10 to about 40° C., optimally around 25° C. Higher and lower temperatures, however, can also be satisfactorily employed, ranging from just above the freezing point of the solution to just below the boiling point thereof at the existing pressure conditions.

Two advantageous embodiments of my invention are illustrated by the attached drawings.

Figure 1 represents an integrated process in which racemic glutamic acid in the form of the hydrochloride is subjected to a preliminary resolution by selectively seeding a supersaturated solution thereof with crystals of L-glutamic acid hydrochloride, and the resulting L-glutamic acid hydrochloride crystals are purified by conversion to monosodium glutamate and precipitation of monosodium DL-glutamate from a solution thereof.

Figure 2:
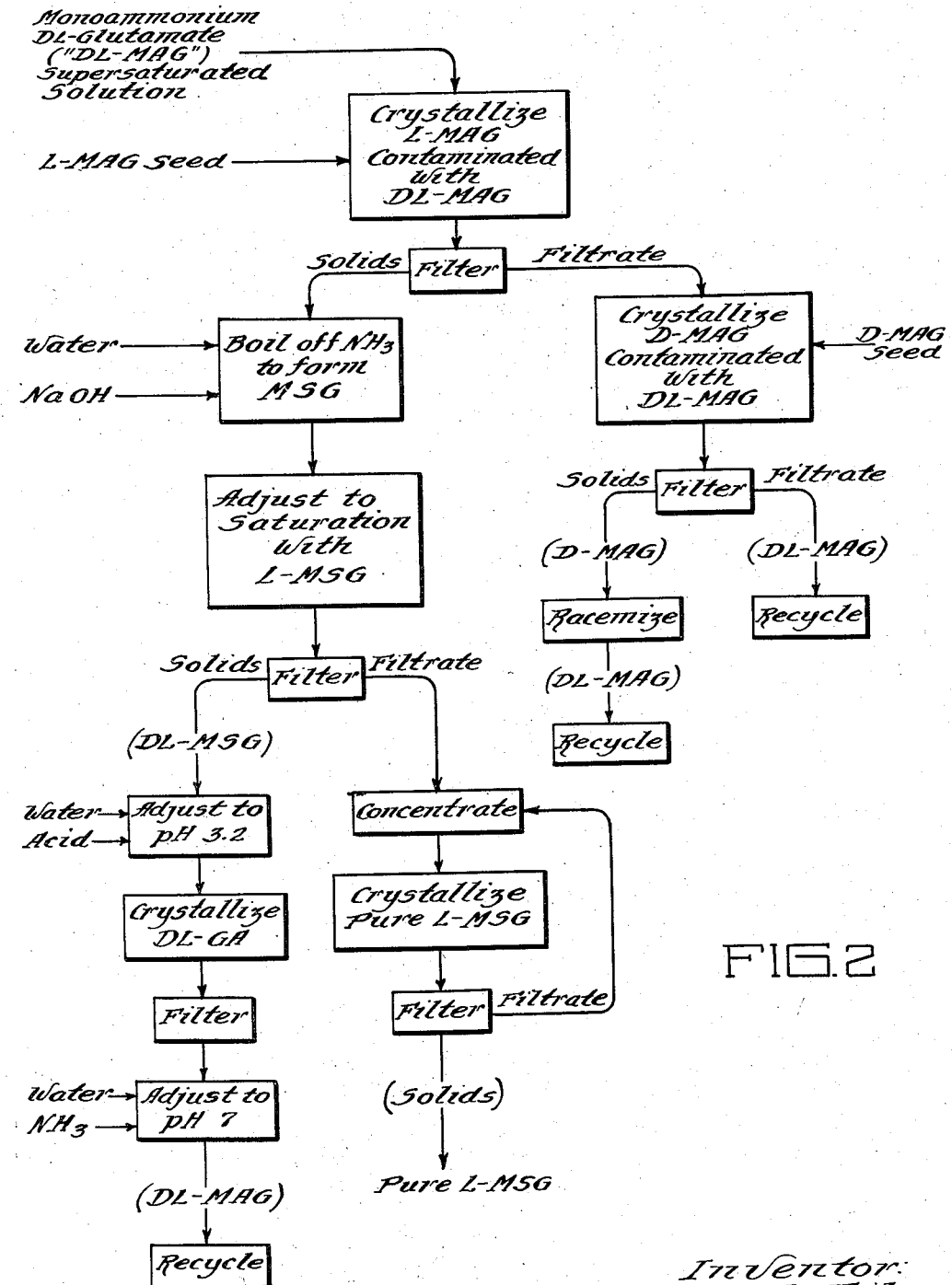

Figure 2 represents an integrated process in which racemic glutamic acid in the form of monoammonium DL-glutamate is subjected to a preliminary resolution by seeding a supersaturated solution thereof with monoammonium L-glutamate crystals, and the resulting monoammonium L-glutamate is purified by conversion into monosodium L-glutamate and precipitation of monosodium DL-glutamate from a solution thereof.

In the process represented by Figure 1, a solution supersaturated with respect to DL-glutamic acid hydrochloride and having a pH below about 0.6 is prepared by dissolving a sufficient quantity of glutamic acid hydrochloride in water. The degree of supersaturation of the solution can be increased as desired by adding hydrogen chloride or concentrated hydrochloric acid and by other means known to the art. The completed solution will contain from about 5 to about 50 parts by weight of DL-glutamic acid hydrochloride per 100 parts of solution at temperatures in the range of around 15 to 40° C., varying as a direct function of the temperature, and from about 30 parts by weight of hydrogen chloride downward to or approaching the zero level, varying as an inverse function of the DL-glutamic acid hydrochloride level. The degree of supersaturation of L-glutamic acid hydrochloride should be in the range of about 10 to about 100%, based on the saturation level, preferably between about 30 and about 60%. The solution should preferably contain between about 10 and about 30% by weight of DL-glutamic acid hydrochloride and between about 20 and about 5% by weight of excess hydrogen chloride. The supersaturated solution is seeded with crystals of L-glutamic acid hydrochloride in an amount preferably at least about 5% by weight based on the weight of DL-glutamic acid hydrochloride in the solution, and optimally between about 10 and about 25% by weight on this basis. The seeded solution is agitated gently, preferably at about room temperature (20 to 30° C.) to permit solids to crystallize therefrom. The crystallized solids are largely L-glutamic acid hydrochloride. A maximum degree of resolution is achieved in about 10 to about 60 minutes, after which D-glutamic acid hydrochloride ordinarily begins to crystallize in objectionable amounts. The crystallization is accordingly terminated as soon as such undesirable crystallization is evidenced by periodic measurement of the rotation of the residual solution.

The resulting slurry is rapidly filtered. The filtrate, which remains supersaturated with D-glutamic acid hydrochloride, is seeded with the latter to cause selective crystallization thereof. The D-glutamic acid hydrochloride is separated, racemized by known techniques, and recycled to the first step of the process. D-glutamic acid hydrochloride mother liquor contains largely DL-glutamic acid hydrochloride, which is recycled to the first step of the process, suitably after being concentrated to around the saturation level.

The L-glutamic acid hydrochloride crystals from the first step, ordinarily containing from about 1 to about 10% by weight of the D-isomer, are slurried in water and adjusted to pH 3.2 with sodium hydroxide solution. The hydrochloride moiety reacts with the sodium hydroxide during such adjustment, yielding sodium chloride, which remains in solution, while the liberated L-glutamic acid crystallizes out, in combination with the DL-glutamic acid contaminant. The crystals are filtered off, and the filtrate is recycled for the treatment of additional L-glutamic acid hydrochloride, a portion of such filtrate being withdrawn from time to time to separate sodium chloride therefrom before recycle.

The impure L-glutamic acid is slurried in water and dissolved in the form of monosodium glutamate by adjustment to pH 7 with sodium hydroxide solution. The resulting solution is adjusted to the saturation point of monosodium L-glutamate by adding or evaporating water. Under these conditions, monosodium DL-glutamate remains almost completely insoluble and is filtered off. The DL-glutamic acid values thus recovered are recycled, after conversion to DL-glutamic acid hydrochloride, to the first step of the process.

The filtrate is a solution of substantially pure monosodium L-glutamate. It is concentrated and cooled to crystallize substantially pure monosodium L-glutamate therefrom, which is filtered off and dried. The filtrate is recycled to the concentration step, a portion being withdrawn from time to time to remove inorganic salts before recycle.

In the process illustrated by Figure 2, a supersaturated solution of monoammonium DL-glutamate is prepared, for example, by slurrying crystalline DL-glutamic acid in water and adding a sufficient quantity of ammonia or ammonia solution to produce a pH between about 6 and about 9, preferably between about 7 and about 8.5. The concentration of monoammonium L-glutamate is adjusted to a level between about 10 and about 50% above the saturation level under the existing conditions of temperature and pH, preferably between about 15 and about 30%. The saturation level of monoammonium L-glutamate, expressed as the monohydrate, varies with temperature and pH in the following way:

| Temperature, 21° C | Concentration at Saturation | |
|---|---|---|
|  | pH 6.5, wt.-percent | pH 7.5, wt.-percent |
| 21 | 48.5 | 47.8 |
| 25 | 51.2 | 49.5 |
| 30 | 52.1 | 52.7 |
| 35 | 54.4 | 53.8 |

The temperature is adjusted as necessary to the range of about 15 to about 30° C., preferably between about 20 and about 30° C., and the solution is seeded with at least about 5% by weight of monoammonium L-glutamate monohydrate crystals, based upon the weight of monoammonium L-glutamate monohydrate in the solution, optimally between about 10 and about 30%. The seeded solution is agitated gently to assist crystallization, while the temperature is maintained at the desired level by suitable means. Under these conditions, monoammonium L-glutamate monohydrate crystallizes selectively from solution, and the degree of resolution ordinarily reaches a maximum in a period of about 10 to about 60 minutes, as may readily be determined by polariscopic observation of the residual liquor. When such maximum is reached, the slurry is promptly filtered.

The filtrate, which contains monoammonium D-glutamate in supersaturated condition, is subjected to a similar resolution procedure by seeding with crystals of monoammonium D-glutamate. The resulting crystals of monoammonium D-glutamate are filtered off, racemized in a known manner, and recycled to the first step of the process. The mother liquor contains largely monoammonium DL-glutamate, which can be directly recycled, suitably after concentration to around the saturation point.

The crystals of monoammonium L-glutamate from the first step of the process, ordinarily containing from about 1 to about 20% by weight of monoammonium D-glutamate, are slurried in water, admixed with an equivalent quantity of sodium hydroxide, and boiled to drive off ammonia, which can readily be recovered for re-use. The resulting solution of monosodium L-glutamate contaminated with monosodium D-glutamate is adjusted to the saturation point of monosodium L-glutamate by evaporating or adding water. When this point is reached the D-isomer has formed monosodium DL-glutamate, which is almost completely insoluble and is filtered off.

The filtrate, containing substantially pure monosodium L-glutamate, is concentrated and cooled to permit crystallization of the desired pure salt. The purified monosodium L-glutamate is filtered off and dried. The filtrate is recycled to the concentration step.

The recovered monosodium DL-glutamate is dissolved in water and acidified to pH 3.2, and DL-glutamic acid is crystallized therefrom. The latter is filtered off and reconverted to monoammonium DL-glutamate for recycle to the first step of the process.

The following operating examples will more fully illustrate my invention. All parts and percentages are by weight unless otherwise indicated.

*Example 1*

A solution containing 63.6 parts of monosodium L-glutamate and 5.8 parts of monosodium D-glutamate in 98.6 parts of water was allowed to stand overnight at 25° C. At the end of this time, all of the D-isomer had crystallized as the racemic salt and was removed by filtration. The filtrate contained 63 parts of monosodium L-glutamate monohydrate which analyzed 99.7% pure, dry basis.

In a similar test in which the crystallization was carried out at −10° C., the filtrate contained 62 parts of monosodium L-glutamate monohydrate which analyzed 99.1% pure, dry basis.

*Example 2*

The tests of Example 1 were repeated on a solution containing 69.4 parts of monosodium L-glutamate and 11.5 parts of monosodium D-glutamate in 101.1 parts of water.

From the 25° C. crystallization, the filtrate contained 62 parts of monosodium L-glutamate monohydrate of 99.7% purity.

From the crystallization at −10° C., the filtrate contained 61 parts of monosodium L-glutamate monohydrate of 98.1% purity.

*Example 3*

An aqueous mixture containing 88 parts of L-glutamic acid and 44 parts of D-glutamic acid was adjusted to pH 7 with aqueous sodium hydroxide solution. A sufficient quantity of water was then added so that the mixture contained a total of 70 parts of water. The mixture was allowed to stand 72 hours at room temperature, at the end of which time the D-isomer had crystallized and separated completely as monosodium DL-glutamate dihydrate, and was removed by filtration. The filtrate contained 34 parts of monosodium L-glutamate monohydrate of 99.1% purity.

Example 4

A mixture of 63.6 parts of monosodium D-glutamate and 5.8 parts of monosodium L-glutamate in 98.6 parts of water was allowed to stand overnight at 25° C. The resulting crystals of racemic salt were filtered off, and the filtrate was found to contain 63 parts of monosodium D-glutamate monohydrate of 99.6% purity.

Example 5

A series of selective crystallizations were carried out at 25° C., following in general the procedure described in Example 1, and employing starting mixtures containing various ratios of monosodium L-glutamate to monosodium D-glutamate, for the purpose of determining the effect of the starting ratio on the purity of the monosodium L-glutamate ultimately obtained. The results were as follows:

| Input L:D Ratio | Product Purity | |
| --- | --- | --- |
| | Range, Percent | Average, Percent |
| 9:1 | 99.1-100 | 99.4 |
| 7:1 | 98.1-100.8 | 99.3 |
| 3:1 | 99.1-99.6 | 99.4 |
| 2:1 | 99.1-99.3 | 99.2 |

Within the foregoing range, it is apparent that the initial L:D ratio was without effect on the product purity.

While I have described my invention with reference to specific charging stocks, processing materials, and operating steps and conditions, it is to be understood that such matters are illustrative only and not by way of limitation. Numerous modifications and equivalents of the invention will be apparent to those skilled in the art from the foregoing description.

This application is a continuation-in-part of my copending application Serial No. 591,815, filed June 18, 1956, now abandoned.

In accordance with the foregoing description, I claim as my invention:

1. A process for separating and purifying a racemic glutamic acid mixture, which comprises effecting a partial resolution thereof to obtain a composition predominating in one enantiomorph and containing at least a small proportion of the other enantiomorph, commingling the resulting composition in the form of the monosodium glutamate salts with water in such a proportion as to obtain an aqueous solution wherein the concentration of said optically active isomer in excess of the concentration of its enantiomorph is at least about 80% of the saturation level of said optically active isomer, whereby a slurry is obtained containing racemic monosodium DL-glutamate in the solid phase, and separating said solid phase from said slurry, leaving the desired optically active isomer in solution, substantially free from its enantiomorph.

2. A process as in claim 1 wherein said monosodium DL-glutamate solid phase is converted into a racemic glutamic acid mixture and recycled to said partial resolution.

3. A process for separating and purifying a racemic glutamic acid mixture, which comprises preparing a supersaturated solution of said mixture in the form of a glutamic acid hydrohalide salt selected from the group consisting of the hydrochloride, the hydrobromide, and the hydriodide, seeding said solution with crystals of one enantiomorph, fractionally crystallizing said enantiomorph, separating from the resulting slurry a crystal crop predominating in said enantiomorph and containing at least a small proportion of the other enantiomorph, converting said crystals into an aqueous solution of the corresponding monosodium glutamates substantially saturated with the predominating enantiomorph, under which conditions the other enantiomorph forms monosodium DL-glutamate, which is substantially completely insoluble therein, separating solid monosodium DL-glutamate from said solution, leaving said predominating enantiomorph therein in substantially pure form, and recovering said enantiomorph therefrom.

4. A process as in claim 3 wherein said solid monosodium DL-glutamate is converted into a racemic glutamic acid mixture in the form of a glutamic acid hydrohalide salt selected from said group and is recycled to the preparation of said supersaturated solution.

5. A process for separating and purifying a racemic glutamic acid mixture, which comprises preparing a supersaturated solution of said mixture in the form of the monoammonium glutamate salts, seeding said solution with crystals of one enantiomorph of said salts, fractionally crystallizing said enantiomorph, separating from the resulting slurry a crystal crop predominating in said enantiomorph and containing at least a small proportion of the other enantiomorph, converting said crystals into an aqueous solution of the corresponding monosodium glutamates substantially saturated with the predominating enantiomorph, under which conditions the other enantiomorph forms monosodium DL-glutamate, which is substantially completely insoluble therein, separating solid monosodium DL-glutamate from said solution, leaving said predominating enantiomorph therein in substantially pure form, and recovering said enantiomorph therefrom.

6. A process as in claim 5 wherein said solid monosodium DL-glutamate is converted into a racemic glutamic acid mixture in the form of the monoammonium glutamate salts and is recycled to the preparation of said supersaturated solution.

7. The process of claim 1 wherein said desired optically active isomer is monosodium L-glutamate.

8. The process of claim 1 wherein said desired optically active isomer is monosodium D-glutamate.

9. A process as in claim 1 wherein another water-soluble sodium salt is incorporated in said slurry to further repress the solubility of monosodium DL-glutamate therein.

10. A process for separating and purifying a racemic glutamic acid mixture, which comprises effecting a partial resolution thereof to obtain a composition predominating in one enantiomorph and containing at least a small proportion of the other enantiomorph, preparing an aqueous solution of said composition in the form of the monosodium glutamate salts wherein the concentration of said optically active isomer in excess of the concentration of its enantiomorph is sufficient to substantially saturate the aqueous solvent, crystallizing monosodium DL-glutamate therefrom, and separating the crystallized salt, leaving the desired optically active isomer in solution, substantially free from its enantiomorph.

11. A process for separating and purifying DL-glutamic acid hydrochloride which comprises preparing an aqueous solution containing between about 10 and about 30% by weight of DL-glutamic acid hydrochloride and between about 20 and about 5% by weight of excess hydrogen chloride and having a pH below about 0.6 and a temperature around 20 to 30° C., seeding said solution with between about 10 and about 25% by weight of crystals of L-glutamic acid hydrochloride, based on the DL-glutamic acid hydrochloride in the solution, allowing crystallization to proceed for about 10 to about 60 minutes, filtering the resulting slurry to separate crystals of L-glutamic acid hydrochloride containing from about 1 to about 10% by weight of D-glutamic acid hydrochloride, slurrying said crystals in water, adjusting the pH thereof to about 3.2 with sodium hydroxide solution, whereby the free glutamic acids are obtained in crystalline form, separating the crystalline acids, slurrying the acids in water, adjusting the mixture to about pH 7 with sodium hydroxide solution, adjusting the concentration of the resulting monosodium glutamate solution to about the saturation level of monosodium L-glutamate, under which conditions the monosodium D-glutamate present therein forms insoluble monosodium DL-glutamate, and filtering the resulting slurry, whereby an aqueous solution of substantially pure monosodium L-glutamate is obtained.

12. A process for resolving a mixture of monoammonium glutamate enantiomorphs which comprises preparing an aqueous solution of said mixture supersaturated with said enantiomorphs at a pH between about 6 and about 9 and a temperature between about 15 and about 35° C., seeding said solution with crystals of one enantiomorph and allowing said enantiomorph to crystallize therefrom at a temperature and a pH within said range, continuing the crystallization until a minor proportion of the other enantiomorph has also crystallized, separating the crystals from the resulting slurry, reacting said crystals with sodium hydroxide in aqueous solution to a pH between about 6 and about 8 to produce a solution of monosodium glutamates predominating in one enantiomorph, concentrating the resulting solution as required until saturated with the predominating enantiomorph, whereby the other enantiomorph crystallizes substantially quantitatively in the form of monosodium DL-glutamate, and separating said monosodium DL-glutamate from the liquid phase, whereby a substantially pure solution of the monosodium salt of said predominant enantiomorph is obtained.

13. A process for resolving monoammonium DL-glutamate which comprises preparing an aqueous solution thereof having a pH between about 6 and about 9 and a temperature between about 15 and about 35° C., seeding said solution with crystals of one enantiomorph of monoammonium glutamate and allowing said enantiomorph to crystallize therefrom at a temperature and a pH within said range, continuing the crystallization until a minor proportion of the other enantiomorph has also crystallized, separating the crystals from the resulting slurry, commingling said crystals with aqueous sodium hydroxide solution in a proportion to give a pH between about 6 and about 8 and to produce a solution substantially saturated with the monosodium salt of the predominating enantiomorph, stripping ammonia therefrom, whereby the other enantiomorph is converted substantially quantitatively into monosodium DL-glutamate in solid form, and separating said monosodium DL-glutamate from the liquid phase, whereby a substantially pure solution of the monosodium salt of said predominant enantiomorph is obtained.

14. A process for separating and purifying monoammonium DL-glutamate which comprises preparing an aqueous solution of monoammonium DL-glutamate having a temperature between about 20 and about 30° C. and a pH between about 7 and about 8.5 and containing monoammonium L-glutamate at a concentration between about 15 and about 30% by weight above the saturation level under the existing conditions of temperature and pH, seeding the resulting solution with between about 10 and about 30% of monoammonium L-glutamate monohydrate crystals, based upon the weight of monoammonium L-glutamate monohydrate in the solution, allowing monoammonium L-glutamate monohydrate to crystallize for a period of about 10 to about 60 minutes, filtrating the resulting slurry to separate crystals of monoammonium L-glutamate monohydrate containing from about 1 to about 20% by weight of monoammonium D-glutamate monohydrate, slurrying said crystals in water, adding thereto an equivalent quantity of sodium hydroxide, stripping off the liberated ammonia, whereby an aqueous solution of monosodium glutamates is obtained, adjusting said solution to about the saturation level of monosodium L-glutamate, under which conditions the monosodium D-glutamate present therein forms insoluble monosodium DL-glutamate, and filtering the resulting slurry, whereby an aqueous solution of substantially pure monosodium L-glutamate is obtained.

References Cited in the file of this patent

UNITED STATES PATENTS

| | | |
|---|---|---|
| 2,650,938 | Gero | Sept. 1, 1953 |
| 2,790,001 | Purvis | Apr. 23, 1957 |